United States Patent
Gutelius (10) Patent No.: US 9,476,469 B2
(45) Date of Patent: Oct. 25, 2016

(54) ELECTRIC DRUM OR DRUM-IN-HAT PARK BRAKE

(71) Applicant: AKEBONO BRAKE INDUSTRY CO., LTD., Chuo-ku, Tokyo (JP)

(72) Inventor: Kenneth Eric Gutelius, Lake Orion, MI (US)

(73) Assignee: AKEBONO BRAKE INDUSTRY CO., LTD, Tokyo (JP)

( * ) Notice: Subject to any disclaimer, the term of this patent is extended or adjusted under 35 U.S.C. 154(b) by 0 days.

(21) Appl. No.: 14/567,617

(22) Filed: Dec. 11, 2014

(65) Prior Publication Data

US 2015/0204402 A1 Jul. 23, 2015

Related U.S. Application Data

(60) Provisional application No. 61/930,069, filed on Jan. 22, 2014.

(51) Int. Cl.
*F16D 65/66* (2006.01)
*F16D 65/14* (2006.01)
(Continued)

(52) U.S. Cl.
CPC .............. *F16D 65/14* (2013.01); *F16D 51/20* (2013.01); *F16D 51/28* (2013.01); *F16D 63/004* (2013.01); *F16D 65/22* (2013.01); *F16D 2121/24* (2013.01); *F16D 2125/40* (2013.01);
(Continued)

(58) Field of Classification Search
CPC .... F16D 51/28; F16D 65/14; F16D 2121/24; F16D 2131/00; F16D 2151/50

USPC .............. 188/72.6, 156–164, 325, 330, 343, 188/196 V
See application file for complete search history.

(56) References Cited

U.S. PATENT DOCUMENTS 2,885,032 A    5/1959   Dombeck
3,770,879 A *  11/1973  Watson .................... F16H 37/00
                                                475/7
(Continued)

FOREIGN PATENT DOCUMENTS

EP      2878849 A2    6/2015
JP      2009052682 A  3/2009
(Continued)

OTHER PUBLICATIONS

Potentially related U.S. Appl. No. 14/529,739, filed Oct. 31, 2014.
(Continued)

*Primary Examiner* — Christopher Schwartz
(74) *Attorney, Agent, or Firm* — The Dobrusin Law Firm, P.C.

(57) ABSTRACT

A linear actuation assembly comprising: (a) a differential assembly and (b) a pair of linear actuators in communication with the differential assembly; wherein the pair of linear actuators are movable along an axis so that during movement of each of the pair of linear actuators a pair of brake shoes are moved to create a brake force or moved to release a brake force, and wherein the differential assembly distributes power equally to each of the pair of linear actuators until resistance of one of the brake shoes increases then the differential assembly ceases to provide power to the brake shoe with increased resistance and distributes the power from the brake shoe with increased resistance to a brake shoe of lower resistance until a brake force is created.

17 Claims, 5 Drawing Sheets

(51) Int. Cl.
*F16D 51/28* (2006.01)
*F16D 51/20* (2006.01)
*F16D 63/00* (2006.01)
*F16D 65/22* (2006.01)
F16D 121/24 (2012.01)
F16D 125/50 (2012.01)
F16D 125/52 (2012.01)
F16D 125/40 (2012.01)
F16D 125/48 (2012.01)

(52) U.S. Cl.
CPC ....... *F16D2125/48* (2013.01); *F16D 2125/50* (2013.01); *F16D 2125/52* (2013.01)

(56) References Cited

U.S. PATENT DOCUMENTS

| | | | |
|---|---|---|---|
| 3,809,191 A | 5/1974 | Woodward | |
| 5,103,944 A * | 4/1992 | Severinsson | F16D 65/22 188/343 |
| 5,148,894 A | 9/1992 | Eddy | |
| 5,524,735 A * | 6/1996 | Gee | F16D 65/22 188/330 |
| 5,769,189 A | 6/1998 | Heibel et al. | |
| 5,785,157 A | 7/1998 | Scott et al. | |
| 5,913,390 A | 6/1999 | Hostetler | |
| 6,098,763 A | 8/2000 | Holding | |
| 6,139,460 A | 10/2000 | Drennen et al. | |
| 6,446,768 B2 | 9/2002 | Kikuta et al. | |
| 6,684,988 B2 | 2/2004 | Kapaan et al. | |
| 8,181,750 B2 | 5/2012 | Homma et al. | |
| 8,185,287 B2 | 5/2012 | Maron et al. | |
| 8,292,050 B2 | 10/2012 | Kim | |
| 8,887,878 B2 * | 11/2014 | Flodin | F16D 51/18 188/196 V |
| 9,145,950 B2 | 9/2015 | Dettenberger et al. | |
| 9,188,182 B2 | 11/2015 | Park et al. | |
| 2002/0000350 A1 * | 1/2002 | Murayama | F16D 51/00 188/74 |
| 2003/0164272 A1 * | 9/2003 | Chun | F16D 65/22 188/343 |
| 2006/0278477 A1 | 12/2006 | Balz et al. | |
| 2012/0031716 A1 * | 2/2012 | Flodin | F16D 51/18 188/79.63 |
| 2013/0087422 A1 * | 4/2013 | Park | F16D 65/22 188/325 |
| 2013/0153349 A1 * | 6/2013 | Akada | F16D 51/48 188/325 |
| 2014/0000992 A1 * | 1/2014 | Tajima | F16D 65/18 188/72.1 |
| 2014/0034432 A1 * | 2/2014 | Bull | B60T 13/741 188/106 R |
| 2015/0129371 A1 * | 5/2015 | Gutelius | F16D 65/18 188/72.6 |

FOREIGN PATENT DOCUMENTS

KR 1020100043694 A 4/2010
WO 2015/151052 A1 10/2015

OTHER PUBLICATIONS

Extended European Search Report for Application No. 15151149.0 dated Nov. 9, 2015.

* cited by examiner

ELECTRIC DRUM OR DRUM-IN-HAT PARK BRAKE

FIELD

The present teachings relate to an electric brake that is used in conjunction with an existing brake system so that the brake system includes a parking brake.

BACKGROUND

The present teachings are predicated upon providing an improved parking brake for use in an existing disc brake system for use with vehicles. For example, the disc brake system may be used with almost any vehicle (e.g. car, truck, bus, train, airplane, or the like). Alternatively, the disc brake system may be integrated into assemblies used for manufacturing or other equipment that require a brake such as a lathe, winder for paper products or cloth, amusement park rides, wind turbines, or the like. However, the present teachings are most suitable for use with a passenger vehicle (e.g., a car, truck, sports utility vehicle, or the like).

Generally, a disc braking system includes a rotor, a caliper body, a support bracket, an inboard brake pad, and an outboard brake pad that are on opposing sides of the rotor. The caliper body further includes one or more fingers (with or without a piston), one or more piston bores, and a bridge that connects the one or more fingers to the piston bore or two opposing piston bores together. The piston bore houses a piston and has a bore axis that the piston moves along during a brake apply and a brake retract. During a pressure apply the fluid will push the piston towards the front opening in the piston bore and into contact with a brake pad that generally includes a pressure plate and friction material and the friction material will contact the rotor on one side and an opposing brake pad will contact the rotor on an opposing side creating friction to stop rotation of the rotor and any component connected to the brake system. The rotor includes a hat that may be used as a drum to house brake shoes that may be used to create a parking force. Alternatively, the brake system may include a drum brake assembly that houses a pair of brake shoes in a drum that are moved by a link or a cable into contact with an inner surface of the drum to create a brake force and/or parking brake force.

In these non-braking conditions when the vehicle is parked, a parking brake may be used to prevent movement of the vehicle. The parking brake may be a discrete braking system or may use one or more components of a primary braking system. Parking brake systems typically include one or more brake pads and/or brake shoes that may be moved to create a parking force so that the vehicle is restrained during non-movement of a vehicle. These parking brake systems may be actuated by a cable, a link, a piston, or a combination thereof that when moved biases a device that simultaneously actuates the brake pads and/or brake shoes to generate the parking force within the hat of a rotor and/or a drum.

Examples of braking systems and associated parking brake systems are disclosed in U.S. Pat. Nos. 2,885,032; 3,809,191; 5,785,157; 5,913,390; 6,446,768; 6,684,988; 8,2920,080 and Patent Application Publication No. 2013/0087422 all of which are expressly incorporated herein by reference for all purposes. It would be attractive to have an electric parking brake system that may be used with a drum brake and/or drum-in-hat brake system. What is needed is a parking brake system that utilizes existing, brake components such as a rotor to create a braking force (e.g., a parking brake force). What is needed is a brake system that evenly distributes a braking force between two brake components so that the braking force created by both brake shoes is substantially equal.

SUMMARY

One possible example of the present teachings include: a linear actuation assembly comprising: (a) a differential assembly and (b) a pair of linear actuators in communication with the differential assembly; wherein the pair of linear actuators are movable along an axis so that during movement of each of the pair of linear actuators a pair of brake shoes are moved to create a brake force or moved to release a brake force, and wherein the differential assembly distributes power equally to each of the pair of linear actuators until resistance of one of the brake shoes increases then the differential assembly ceases to provide power to the brake shoe with increased resistance and distributes the power from the brake shoe with increased resistance to a brake shoe of lower resistance until a brake force is created.

One possible embodiment of the present teachings include: a brake assembly comprising: (a) a pair of spaced apart brake shoes each including a first end and a second end and (b) a linear actuator assembly located between the first end of the pair of spaced apart brake shoes, the linear actuator comprising: (i) a motor, (ii) a differential assembly in communication with the motor, and (ii) a pair of spaced apart linear actuators in communication with the differential assembly and each of the pair of spaced apart linear actuators in communication with a first end of one of the pair of spaced apart brake shoes; wherein the motor supplies power to the differential assembly and the differential assembly distributes the power to each of the linear actuators and the linear actuators move the brake shoes equally until one of the brake shoes experience a higher resistance and then the differential assembly shifts power and supplies additional power to the brake shoe with a lower resistance.

The present teachings provide an electric parking brake system that may be used with a drum brake and/or drum-in-hat brake system. The present teachings provide a parking brake system that utilizes existing brake components such as a rotor to create a braking force (e.g., a parking brake force). The present teachings provide a brake system that evenly distributes a braking force between two brake components so that braking force is equally distributed along the brake component.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings claim priority to U.S. Provisional Application Ser. No 61/930,069, dated Jan. 22, 2014 the contents of which, are expressly incorporated by reference herein in their eternity for all purposes. The teachings herein provide a brake system. The brake system may function to provide a friction force such as a braking force, a parking brake force, a stopping force, or a combination thereof. The brake system may create a braking force, which is a force that stops rotation of a rotor, stops rotation of a drum, stops movement of a vehicle, or a combination thereof. The brake system may create a parking force, an emergency brake force, or both, which is a force that prevents rotation of a rotor, rotation of a drum, movement of the vehicle, or combination thereof when the vehicle is in a stopped position, is turned off, or both. The brake system may be a pneumatic brake system, an electrical brake system, a hydraulic brake system, or a combination thereof. Preferably, at least a portion of the brake system as taught herein is an electric brake system. The brake system may include a power transfer device (e.g., a belt, gears, etc. . . . ) that transfers power from a power source (e.g., a motor) to one or more brake shoes. The brake system may include gearing that transfers power from a motor to one or more brake shoes. The brake system may include gearing such as a differential assembly that splits power between two halves of the brake system, a torque multiplication assembly that reduces a rotational speed from a motor and increases torque from the motor, or both. The gearing of the total brake system, including but not limited to differential assemblies, torque multiplication assemblies, or both, may include a total gear reduction of about 50:1 or more, about 75:1 or more, or about 100:1 or more (e.g., all of the gears of the brake system may have a gearing of about 100 and the drive shaft may have a gearing of about 1). The gearing of the total brake system may include a total gear reduction of about 500:1 or less, about 400:1 or less, about 300:1 or less, preferably about 250:1 or less, or more preferably about 200:1 or less. The brake system may include one or more brake shoes, one or more pistons, one or more rotors with a hat, a link, a cable, one or more drums, or a combination thereof.

The one or more brake shoes may function to create a friction force (e.g., a stopping force, a parking force, a braking force, or a combination thereof) when moved into contact with another member (e.g., a hat of a rotor, drum, or the like). The one or more brake shoes may include one or more portions that assist in creating a friction force. The one or more brake shoes may be generally curved so that when moved radially outward a friction force is created between the brake shoes and the drum and/or hat. The one or more brake shoes may include a pressure plate and friction material. The one or me re brake shoes may be opposing brake shoes that extend radially outward to create a friction force. The one or more brake shoes may contact opposing sides of a member during a friction force.

The rotor may function to assist in creating a friction force. The rotor may extend between two or more opposing brake pads to create a primary friction force and may house two or more brake shoes to generate a secondary friction force such as a parking brake force. The rotor may be generally circular and include a cylindrically shaped hat that extends from a friction surface. The hat may include an interior open space with an inner circumference that may be contacted by one or more brake, shoes. The hat may be any structure that functions similarly to a drum, that performs the same functions as a drum, may be a drum, or a combination thereof. The hat, the drum, or both may be a cylindrical surface, a cylindrical Gaussian surface, or both that may be a contact surface for one or more brake shoes to generate a friction force. The hat, the drum, or both may house one or more linear actuator assemblies, one or more differential assemblies, one or more planetary assemblies, or a combination thereof.

The one or more linear actuator assembly may function to move one or more brake shoes to create a friction force. The one or more linear actuator assemblies may move one or more brake shoes in unison, individually, or a combination of both to create a friction force. The one or more linear actuator assemblies may axially move one or more drive screws and the one or more drive screws may each move an end of one or more brake shoes. The one or more linear actuators may move along an axis so that the brake shoes are moved radially outward into contact with a drum and/or hat to create a friction force. A rotational speed of the one or more linear actuators may be lower than a rotational speed of a motor. The rotational speed of the actuator may be reduced relative to the motor speed by one or more reduction gears, one or more torque multiplication assemblies, or both. The one or more linear actuator assemblies may include one or more housings that are connected directly and/or indirectly to a motor.

The motor (e.g., power supply) may function to provide energy to one or more housings, one or more linear actuators, or both so that a friction force is generated. The motor may function to directly and/or indirectly move one or more linear actuator assemblies. The motor may be an electric motor, a pneumatic power supply, a hydraulic power supply, any other power supply that will move one or more brake shoes to create a braking force, or a combination thereof. Preferably, the motor may function to actuate the one or more brake shoes by rotating a housing of the linear actuator assembly, rotating a gear (e.g., ring gear) about the housing, rotating a gear adjacent to the housing, or a combination thereof. The motor may include one or more drive shafts that extend from the motor and transfer power from the motor to a linear actuator assembly. The motor, drive shaft, or both may be directly in contact with a ring gear and the ring gear may be in contact with a housing.

The ring gear may function to transfer power from a motor to a linear actuator assembly, one or more brake shoes, one or more differential assemblies, one or more torque multiplication assemblies, or a combination thereof. The ring gear may receive power directly and/or indirectly from the motor and distribute the power to a housing, a differential assembly, a torque multiplication assembly, or a combination thereof. The ring gear may be rotated by a reduction gear, a reduction gear drive shaft, a worm gear (e.g., a gear with helical grooves and/or teeth that wrap around the gear to transfer torque to another device from the motor), power gears, or a combination thereof. The ring gear may include a plurality of teeth around an inside, a plurality of teeth around an outside, or both. The teeth may be configured so that the ring gear may be driven by a gear with interconnecting teeth, a gear that is helically wrapped, a gear that extends at 90 degrees to the ring gear, or a combination thereof. The ring gear may be geared so that the ring gear is the same size as the gearing of the drive shaft, the gear ratio from the drive shaft to the ring gear may increase and/or decrease. Preferably, the gear ratio from the drive shaft to the ring gear increases so that the drive shaft applies a high amount of torque to the ring gear so that a sufficient amount of power is applied to the brake shoes to create a friction farce. The gear reduction from the drive shaft to the ring gear may be about 1:1 or more, about 2:1 or more, or preferably about 3:1 or more (e.g., the ring gear has a ratio of about 4:1 when compared to the drive shaft). The gear reduction from the drive shaft to the ring gear may be about 50:1 or less, about 25:1 or less, or about 10:1 or less. The ring gear may function to rotate instead of a housing being rotated, may function to rotate a housing, or both.

The housing may function to hold one or more gears, provide power to one or more side gears, assist in moving one or more brake shoes, or a combination thereof. The housing may function to hold the side gears and pinion gears in communication. The housing may be static. The housing may be rotationally movable but longitudinally static, laterally static, or both. The housing may rotate about an axis so that energy is transferred to one or both side gears and then to one or both piston assemblies. Preferably, the housing is both longitudinally static and rotationally static, and components within the housing are movable to create a braking force. The housing may be part of a differential assembly, a torque multiplication assembly, or both. The housing may connect a differential to a shaft, a motor, a brake assembly, or a combination thereof. The housing may be rotated around an axis by the motor so that power is transferred from the housing to one or more drive screws, one or more differential assemblies, one or more torque multiplication assemblies, or a combination thereof. The housing may include one or more linear actuators, one or more differential assemblies, one or more torque multiplication assemblies, or both.

The one or more linear actuators may function to move one or more brake shoes from an off position to a braking position. The one or more linear actuators may move the one or more brake shoes radially outward into contact with a drum, a hat, or both to create a braking force. The one or more linear actuators may include one or more components that axially move (relative to their axis), radially move (relative to the drum and/or hat), or both to create a braking force. Preferably, the linear actuators include a drive screw, a drive gear, a bearing, a housing, a worm gear, or a combination thereof.

The one or more drive screws may function to move one or more brake shoes to create a friction force. The one or more drive screws may axially move along and/or rotationally move around an axis of the drive screw, an axis of the drive gear, or both to create a friction force. The one or more drive screws may move along an axis so that the brake shoes are moved radially outward to generate a braking force. The one or more drive screws may be configured so that an electric motor, a hydraulic device, a pneumatic device, a linear actuator, a stepper motor, or a combination thereof may move the drive screw along an axis to create friction force. The one or more drive screws may function to be moved in any manner so that the drive screws contact a brake shoe and/or component connected to a brake shoe and axially move the brake shoe to create a braking force, a parking force, or both. The one or more drive screws may include one or more threads and/or teeth that assist in axially moving the drive screw. The one or more drive screws may be made of any material that is resistant to a fluid and in particular brake fluid. The one or more drive screws may be made of plastic, phenolic resin, a metal (e.g., steel, stainless steel, aluminum, or a combination thereof), a polymer, or a combination thereof. The one or more drive screws may be substantially solid. The one or more drive screws may include a pushing portion and an elongated portion. The drive screw may include one or more gears, one or more, geared portions, or both on the elongated portion so that the drive screw may be rotated and axially moved. The pushing portion may function to contact the brake shoe and/or component connected to the brake shoe so that upon movement of the drive screw to a braking position a friction force is created.

The elongated portion may function to move the pushing portion along an axis to move the piston. The elongated portion may be in communication with a component, that moves the drive screw axially. The elongated portion may be threaded, may include one or more axial driving features, or both. The elongated portion may be rotated relative to the pushing portion. Preferably, the elongated portion and the pushing portion may move as one unit. The one or more drive screws may be rotated about an axis and as the one or more drive screws rotate, the drive screw may extend along an axis. Preferably, the one or more drive screws remain substantially static and one or more components (e.g., drive gears) rotate about the drive screw to axially advance the drive screw. More preferably, a drive gear may rotate around the drive screw and move the drive screw axially towards and away from the piston so that a friction force is created.

The one or more drive gears may function to actuate one or more drive screws axially so that a friction force is created. The one or more drive gears may function to axially move one or more drive screws along its axis, a drive screw axis, or both. The one or more drive gears may be static and the one or more drive screws may move within the drive gears in order to axially move. The one or more drive screws may substantially surround a portion of the drive gear. Preferably, the one or more drive gears surrounds all or a portion of an elongated portion of the drive screw so that as the drive gear rotates, the drive screw rotates, or both, the drive screw is axially moved through the drive gear, or vice versa. The drive gear may include a portion that extends into the elongated portion of the drive screw so that as the drive gear is rotated the drive screw is axially moved. The drive gear may include one or more gears, one or more geared portions, or both for rotating the drive gear, the drive screw, or both so that the drive screw is axially moved. The one or more drive gears may multiply torque from the motor, provide an adequate force so that the brake shoes are moved, or both to create a parking force. The one or more drive gears may increase the torque of a high speed motor so that a parking force is rapidly created. The drive screw, the drive gear or both may be connected to the motor via one or more gear reduction gears, one or more differentials, one or more torque multiplication assemblies, or a combination thereof so that torque produced by the drive gears on the brake shoes is greater than the torque produced by the motor. The rotational speed of the drive screw, the drive gear, or both less than the rotational speed of the motor by the ratios set forth herein for gear reductions. For example, if the gear reduction is 50:1 then the motor will rotate 50 times for every 1 revolution of the drive screw and/or drive gear. The drive gear and drive screw may have a connection so that one rotation of the drive gear axially moves the drive screw 1 mm or more, 2 mm or more, 5 mm or more, or even 10 mm or more. The drive gear may be directly driven by a shaft, indirectly driven by a shaft, driven by a gear, or a combination thereof. The drive gear may be connected to the piston bore, a bearing, or both.

The one or more bearings may function to create a low friction device that rotates the drive gear. The one or more bearings may be a rotational device that rotates a drive gear about an axis. The one or more bearings may function to connect the drive gear to a housing. The one or more bearings may allow the drive gear to rotate around an axis, a drive shaft axis, or both. The one or more bearings may be a bearing surface of the drive screw, the drive gear, or both so that the drive screw and/or drive gear may be rotated about an axis. The one or more bearings may be a thrust bearing, a ball bearing, a roller bearing, a fluid bearing, or a combination thereof. The bearings may include one or more seals that seal the bearing relative to the drive gear, the bearing relative to the piston bore, or both. The bearings may be in communication with one or more gears, one or more gears driven by a shaft, one or more gears including a shaft, or a combination thereof.

The one or more shafts may function to provide energy such as power, torque, movement, rotation, or a combination thereof from one component to a second component (e.g., may include teeth around their axis so that the teeth drive an adjacent gear). The one or more shafts may function to rotate one or more gears of the brake system so that a friction force is created. The one or more shafts may extend between a power source (e.g., a motor) and a gear, two adjacent gears, or both. Each of the one or more gears of the linear actuator assembly may include a shaft, be free of a shaft, or a combination of both. The shaft may be a reduction gear drive shaft.

The reduction gear drive shaft may function to extend from a reduction gear into contact with an adjacent gear and increase the rate of rotation of the adjacent gear relative to the power source (e.g., motor), preferably decrease the rate of rotation of the adjacent gear relative to the power source, or both. The reduction gear drive shaft may be larger than the reduction gear. Preferably, the reduction gear drive shaft is smaller than the reduction gear so that the reduction gear and reduction gear drive shaft rotate at slower rate than the power source and the adjacent gear is rotated at a slower rate than the reduction gear and the power source. The reduction gear drive shaft may be connected to the reduction gear, extend from the reduction gear, be part of the reduction gear, or a combination thereof. The reduction gear drive shaft may have a gear reduction from an adjacent gear of about 2:1 or more, about 3:1 or more, about 4:1 or more, or about 5:1 or more (e.g., about 7.4:1). The reduction gear drive shaft may have a gear reduction from the adjacent gear of about 20:1 or less, about 15:1 or less, or about 10:1 or less. For example, for every rotation of the adjacent gear, the reduction gear drive shaft rotates about 6 times (i.e., about 6:1).

The reduction gear may function to vary the rate of rotation, change torque, or both to an adjacent gear, from a power source, or both. Preferably, the reduction gear causes an adjacent gear to rotate at a slower speed then the power source. More preferably, the torque provided by the power source is increased by the reduction gear so that torque provided by the adjacent gear is greater than the torque provided by the motor. The reduction gear may transfer power from a power source, a gear, or both to an adjacent gear, a linear actuator assembly, a differential assembly, a torque multiplication assembly, or a combination thereof. The reduction gear may have any reduction in rotation so that torque is increased, rotation speed is slowed, or both. The reduction gear may be a worm gear, a gear with teeth, or both. For example, the worm gear may be rotated by the motor and provide power to another gear at a different rate than motor. The linear actuator assembly may be free of a reduction gear, and instead may only use a torque multiplication assembly. However, a linear actuator assembly may include both a reduction gear and a torque multiplication assembly. The linear actuator assembly may be free of a reduction gear that extends between a power source and a differential assembly, a torque multiplication assembly, a ring gear, or a combination thereof. The reduction gear may have a reduction from one or more adjacent gears, which drive the reduction gear, of about 1:2 or more, about 1:3 or more, or about 1:4 or more. The reduction gear may have a reduction from one or more adjacent gears, which drive the reduction gear, of about 1:20 or less, about 1:10 or less, or about 1:5 or less. The reduction gear may directly and/or indirectly drive one or more ring gears, one or more differential assemblies, one or more torque multiplication assemblies, or a combination thereof via one or more gears.

The brake assembly, the shaft, the differential, or a combination thereof may include one or more gears and preferably a plurality of gears. The gears may function to provide energy (e.g., torque, power, rotation, movement, or a combination thereof) from one device to an adjacent device so that movement is facilitated. The gears as discussed herein may create a connection between two or more devices so that energy is transferred equally between two or more devices. The gears may be a cog, a sprocket, a belt, a chain, a toothed device, intermeshing pieces, a helical portion, or a combination thereof. Preferably, the gears are two or more toothed devices that include intermeshing teeth that provide energy from one device to the other device. A plurality of gears may be combined together forming a differential assembly, a torque multiplication assembly, the like, or a combination thereof.

The differential assembly may function to provide energy to one or both of the one or more drive screws so that the drive screws create a friction force. The differential assembly may function to actuate the drive screws individually, in unison, or both. The differential assembly may be an epicyclic differential, a spur gear differential, miter gear differential, or a combination thereof. Although not preferred the differential assembly may be a planetary assembly. The differential assembly may be in communication with a torque multiplication assembly such as a planetary assembly, an epicyclic assembly, another differential assembly, or a combination thereof that provides power to the pair of linear actuators, provides gear reduction, provides an increase in torque, or a combination thereof. The differential assembly may function to transfer power to the drive screw assemblies based upon the resistance to each of the drive screws. The differential assembly may function to stop transferring energy to one drive screw when resistance increases and divert additional energy to the drive screw with a lower resistance so that the energy supplied to the drive screw with the lower resistance is increased by a factor of 1.5 or more or 2 or less. The differential assembly may alternate transferring power to the drive screws depending on which drive screw exhibits the least resistance during movement of the drive screws to create a friction force. For example, the differential assembly may assist in moving two drive screws (and associated brake shoes) simultaneously until a resistance on one side increases and then the differential assembly will transfer all of the energy to the drive screw with the lower resistance so that the lower resistance brake assembly is moved twice as fast as when both assemblies are actuated. The differential assembly will alternate and/or simultaneously transfer energy to the drive screws until a predetermined friction force is created. The differential assembly may transfer power by rotating one or more side gears, rotating one or more pinion gears, rotating the entire differential assembly, or a combination thereof.

The side gears may function to transfer energy directly and/or indirectly to one or both brake shoes, one or more both drive screws, one or more drive gears, or a combination thereof to create friction force. The side gears may function to rotate a shaft, a drive gear, or both. The side gears may transfer power from a motor to a shaft, a drive gear, or both. Preferably, the side gears include a portion that is located within a differential assembly and a portion that extends out of the differential assembly so that the portion that extends out of the differential assembly may provide power to one or more adjacent mechanisms (e.g., a drive gear). The portion of the side gear that extends out of the differential assembly may include a contact portion. The contact portion may function to transfer power from the differential assembly to an adjacent structure such as a gear, a drive gear, a drive screw, or a combination thereof. The contact portion may include a plurality of teeth, may be smooth, may be geared, or a combination thereof. The side gears may both rotate about the same axis. The side gears may oppose each other. For example, the side gears may be located in a housing and the side gears may be located on opposite sides of the housing. The side gears may be free of direct contact with each other. The side gears may be movable independently of each other. The side gears may be in communication via one or more pinion gears and preferably a plurality of pinion gears that extend between and contact one or both of the side gears.

The plurality of pinion gears may function to avow the side gears to move independently of each other. The pinion gears may function to transfer power from one side gear to an adjacent side gear. The pinion gears may function to allow one side gear to rotate and one side gear to remain static while a differential housing rotates, a motor rotates one side gear, or both. The pinion gears may function to rotate with the side gears in unison until the resistance of one of the drive screws overcomes a friction force between the pinion gears and the side gears. The pinion gears and side gears may be located within, held in communication, protected by, or a combination thereof a housing. A differential assembly may be free of side gears, pinion gears, a housing, or a combination thereof. The differential assembly may be in communication with a torque multiplication assembly.

A torque multiplication assembly may function to change the rotate of rotation of the gears in a system relative to the rate of rotation of a power source, change the torque provided to downstream gears relative to the torque provided by the power source, or both. Preferably, the torque multiplication assembly increases torque provided by the power source and reduces the rate of rotation of downstream gears. The torque multiplication system may be directly connected to the power source, differential assembly, linear actuators, or a combination thereof. The brake system, the linear actuator assembly, or both may be free of a torque multiplication assembly. The torque multiplication system may be any assembly that increases torque, reduces the rate of rotation of gears, or both. The torque multiplication assembly and the differential assembly as discussed herein may both include parts that are discussed in conjunction with the other. The parts of the torque multiplication system and the differential assembly as discussed herein may be used interchangeably to perform the function recited herein for each respective device. Thus, for example, both the torque multiplication assembly and the differential assembly may include a planet gear and the plant gear may increase torque in the torque multiplication assembly and allow two halves of the differential to operate independently in the differential assembly. The torque multiplication system may be a planetary assembly.

A planetary assembly may function to provide power to one more drive screws in unison and/or individually so that brake shoes are moved and a braking force is created. The planetary assembly may increase torque provided to one or more drive screws. The planetary assembly may reduce a rate of rotation so that an output rotation is slower than an input rate of rotation. A planetary assembly may function to allow one side to stop and one side to move, may allow one side to stop and may transfer power and/or torque to a side that continues to rotate, or both. For example, the planetary assembly may have two discrete halves that are rotationally separate so that the differential assembly may rotate one half without rotating the second half. A planetary assembly may be located between two adjacent brake shoes. A planetary assembly may include two or more annular gears, two or more carriers, a plurality of sun gears, a plurality of planet gears, one or more drive gears, or a combination thereof so that power may be transferred between two or more components, so that two or more components may move individually, or both.

The one or more drive gears and preferably two or more annular gears may function to move one or both sides of the torque multiplication assembly (e.g., a planetary assembly) so that the two or more drive screws and/or two or more brake shoes may be moved individually, so that power may be transferred between the two or more brake shoes, or both. The one or more drive gears may include one or more contact surfaces, one or more sets of teeth, or both for transferring power to and/or from each of the one or more power gears, worm gears, reduction gears, or a combination thereof. The one or more drive gears may each include an axis and the one or more drive gears may be rotated about their own axis. Preferably, when more than one drive gear is present, each drive gear may rotate about the same axis. More preferably, the torque multiplication assembly includes two discrete drive gears. The one or more drive gears may be connected to one or more gears for transferring power from the one or more drive gears to an opposing set of gears. The one or more drive gears may each be in communication with a sun gear. The sun gear may be connected to the drive gear so that the sun gear may transfer power from the drive gear to an adjacent device.

The sun gear may be connected to the drive gear so that as the drive gear rotates the sun gear rotates. The sun gear may function to provide power from the drive gear to the plurality of planet gears, the annular gear, an output shaft, to the brake shoes, or a combination thereof. The sun gear may extend into a center of an annular gear, between the planet gears, or both. The sun gear and the drive gear may have a gear reduction. The sun gear and the drive gear may have the same gearing as the reduction gear and the reduction gear drive shaft and the teachings of those are incorporated herein for reduction of the sun gear and the annular gear. The sun gear may be located on the axis of the annular gear so that the annular gear rotates about the axis and the sun gear.

The annular gear may function to house the sun gear and the planet gears. The annular gear may function to rotate with the sun gear when the planet carrier is held stationary. The annular gear may rotate about the sun gear, rotate with the sun gear, or both. The annular gear may allow the sun gear to continue to rotate if the planet carrier is held static (e.g., when the amount of force required to move the brake shoes increases more than the opposing brake shoe). Preferably, the axis may extent through an open center of the annular gears. The one or more annular gears may be ring shaped with an open center so that one or more sun gears, one or more planet gears, one or more carriers, or a combination thereof may extend into the open center. The open center may include a friction surface, a contact portion, teeth, or a combination thereof that transfers power and/or provides torque to one or more and preferably a plurality of planet gears.

The planet gears may function to allow the one or more annular gears to provide rotational power to a sun gear, provide rotational power to a drive screw, move one or more brake shoes, or a combination thereof. The planet gears may allow the annular gears to rotate independently of a sun gear. The planet gears may rotate with the sun gear, with the annular gears, or both. Preferably, the planet gears continue to rotate if the sun gear or the annular gears are prevented from moving. In one example, if during creation of a braking force one of the brake shoes experiences a higher resistance than the opposing brake shoe the planet carrier will cease to rotate and the planet gears will continue to rotate with the annular gears and the sun gear and torque may be transferred to the differential by the sun gear as the sun gear continues to rotate. All of the planet gears may be located in line, in one plane, on one half of the planetary assembly, staggered within the planetary assembly, in an alternating relationship with a spacer, or a combination thereof. The planet gears may indirectly connect the sun gear to the annular gear so that power is transferred from the annular gear to the sun gear and ultimately to the brake shoes. The planet gears may be held in communication via a carrier.

The carrier (i.e., planet carrier) may hold the two or more and preferably a plurality of planet gears in communication with an inner circumference of an annular gear so that upon rotation of the annular gear the plurality of planet gears are rotated in unison about an axis. The carrier may hold a plurality of planet gears in communication with an adjacent gear so that power is transferred to and/or from the adjacent gear to the carrier. The carrier may hold 3 or more, 4 or more, 5 or more, or even 6 or more planet gears. The carrier may rotate all of the planet gears about a common axis, the carrier may allow all of the planet gears to independent rotate about different axes, or both. The carrier may carry both the planet gears and house the planetary assembly. The planet gears may provide power from the annular gear, ring gear, drive gear, or a combination thereof to the sun gears and ultimately the brake shoes. The carrier may be rotated by the annular gear, ring gear, drive gear, or a combination thereof. The carrier may remain static during rotation. The carrier may include a shaft that extends away from the planet gears to provide power to an adjacent gear. The carrier may include an output shaft. The carrier may be a housing carrier.

The housing carrier may include a plurality of shafts that extend from a first side to a second side and each shaft may include a planet gear and a spacer in an alternating fashion around the carrier so that half of the planet gears contact a first sun gear and half of the planet gears contact a second sun gear. The housing carrier may hold one spacer and one planet gear so that the planet gear may contact an annular gear, a sun gear, a ring gear, or a combination thereof, and the spacer may extend past an annular gear, a sun gear, a ring gear, or a combination thereof without making contact so that one half of the assembly may rotate independently of a second half of the assembly. The spacer may function so that planet gears contact adjacent sun gears in an alternating fashion so that a first half and a second half of the differential assembly, planetary assembly, or both may operate independently. The spacers may align the planet gears and the sun gears so that the planet gears drive the sun gears or vice versa. The spacers may function to be free of contact with one or more gears and allow all or a portion of the assembly, the housing carrier, the housing, or a combination thereof to rotate. The housing carrier may directly contact a sun gear. Preferably, the housing carrier is indirectly in contact with a sun gear through the planet gears. The housing carrier may include a portion that extends from the planet gears to transfer power to an adjacent gear. The housing carrier may include an output shaft.

The output shaft may extend from the carrier (i.e., planet carrier), the housing carrier, or both so that power may be transferred from the sun gear to an adjacent gear, from the drive gear to an adjacent gear, or both. The output shaft may be integrally connected to the carrier, the housing carrier, or both so that as the carrier, the housing carrier, or both is rotated the output shaft is rotated. The output shaft may be driven by the planet gears. The output shaft may extend out from the torque multiplication assembly so that power is provided from the torque multiplication assembly to one or more adjacent gears. An output shaft may extend out from both sides of the torque multiplication assembly so that more than one adjacent gear may be driven. Each output shaft may drive one or more adjacent gears. Preferably, each output shaft drives one adjacent gear. The output shaft may be directly driven by and preferably indirectly driven by one or more power gears.

The one or more power gears may function to drive one or more gears of the torque multiplication assembly so that the torque multiplication assembly moves one or more brake pads. The one or more power gears may provide power to a differential, to a gear reduction set, or both. The one or more power gears may function to drive a portion of the differential assembly, a torque multiplication assembly, or both that provides power so that brake shoes are moved. The one or more power gears may be a worm gear, a cog, a toothed gear, a belt driven gear, a helically wrapped gear, or a combination thereof. The one or more power gears may each drive one or more drive gears. The one or more power gears may each respectively drive one drive gear. Preferably, there are two or more power gears. More preferably, when two or more power gears are present each of the power gears move individually. The power gears may be connected to one or more shafts. The power gears may both be connected to the same shaft. Preferably, each power gear is connected to its own shaft.

The shaft may function to rotate one or more power gears so that one or more brake shoes are moved to create a friction force. The shaft may rotate a single power gear. The shaft may be comprised of multiple shafts that each individually rotate a power gear so that two or more portions of a torque multiplication assembly may be driven individually. The shaft may include two or more portions that are movable individually, relative to each other, or both. Preferably, the shaft includes an inner portion (i.e., inner shaft) and an outer portion (i.e., outer shaft) that each individually drive a power gear, a linear actuator, or both. The inner shaft, the outer shaft or both may each extend from a differential assembly to drive a second differential assembly, (e.g., a spur gear differential assembly, an epicyclic assembly, or both. The inner shaft may extend through a hollow outer shaft so that power may be provided on one side of the differential assembly. The inner shaft may extend from a first side of the differential assembly through a side gear in a second side and out the second side so that the power gears provide power to the linear actuators.

Figure 1:
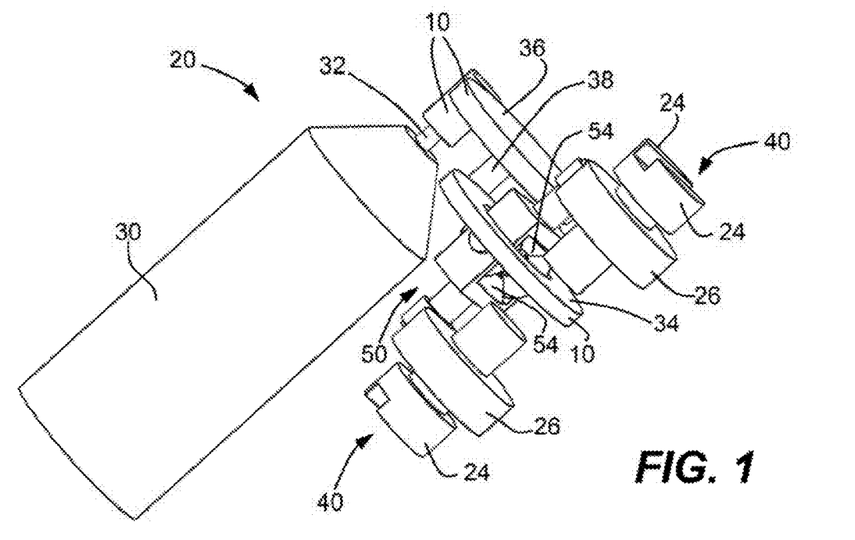
FIG. 1 illustrates a perspective view of a linear actuator assembling including a differential assembly of the teachings herein.

FIG. 1 illustrates a perspective view of a linear actuator assembly 20. The linear actuator assembly 20 includes a motor 30 having a drive shaft 32 that rotates a reduction gear 36. The reduction gear 36 includes a reduction gear shaft 38 that rotates a ring gear 34. The ring gear 34 rotates a differential assembly 50 around an axis. The differential assembly 50 includes a pair of side gears 54 that have a portion that extends outward into contact with a pair of linear actuators 40. The linear actuators 40 include drive gears 26 that are rotated around an axis and as the drive gears 26 rotate a pair of drive screws 24 are moved along the axis actuating a pair of brake shoes (not shown). The gears are depicted as being smooth but at least some of the gears include teeth 10. The drive shaft 32, reduction gear 36, ring gear 34, reduction gear drive shaft 38, side gears 54, and drive gears 26 each include teeth 10. Both of the linear actuators 40 are within a housing 22.

Figure 2:
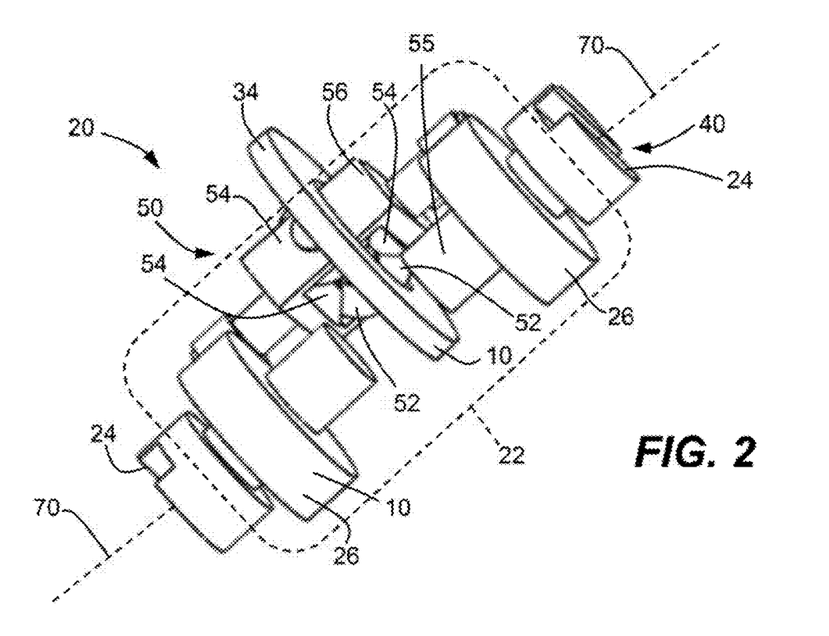
FIG. 2 illustrates a close-up view of the differential assembly of FIG. 1.

FIG. 2 illustrates a close-up view of the linear actuator assembly 20 with the motor removed. A ring gear 34 including teeth 10 is connected to a housing 56 of the differential assembly 50. The differential assembly 50 includes a plurality of pinion gears 52 that are located between a pair of opposing side gears 54. The pair of opposing side gears 54 each include a contact portion 55, having teeth 10, that extends outward and contacts a drive gear 26 having teeth 10. Each drive gear 26 includes a drive screw 24 that includes an axis 70. The linear actuator 40 includes a housing 22 that houses the drive gears 26 and the drive screws 24.

Figure 3:
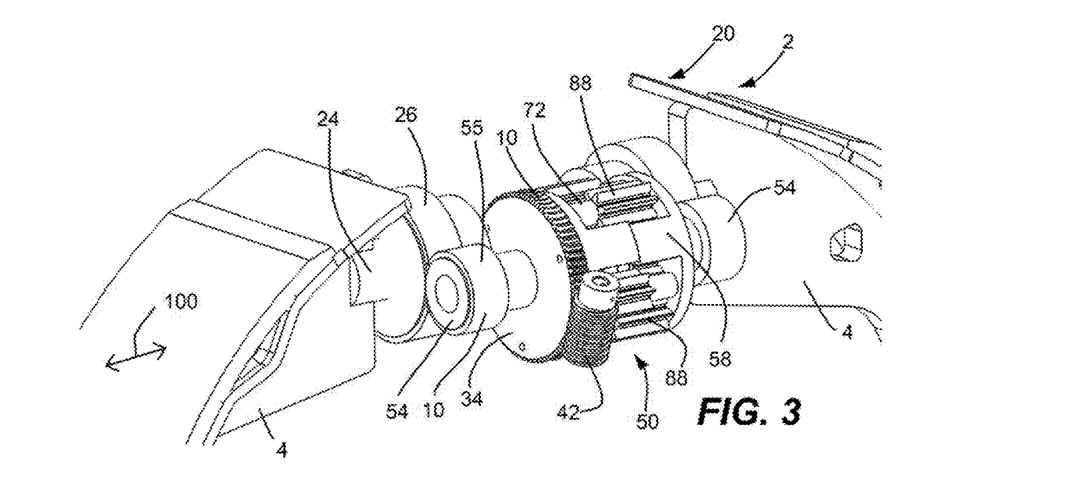
FIG. 3 illustrates a brake system including a linear actuator assembly between two brake shoes.

FIG. 3 illustrates an example of a linear actuator assembly 20 in a brake system 2. The linear actuator assembly 20 is located between two opposing brake shoes 4 so that movement of the linear actuator assembly 20 moves the brake shoes 4 inward and outwards in the directions 100. The linear actuator assembly 20 includes a motor (not shown) that drives a worm gear 42. The worm gear 42 rotates a ring gear 34 that is part of a differential assembly 50. The ring gear 34 having teeth 10 rotates the gears in the differential assembly 50 so that a pair of opposing contact portions 55 are moved individually or in unison. The differential assembly 50 includes a housing 56 with a housing carrier 58 that holds a plurality of planet gears 88 and spacers 72 that are in an alternating relationship. The housing carrier 58 connects two opposing side gears 54 having contact portions 55 so that the side gears 54 can move a pair of opposing drive gears 26 in unison or individually. The drive gear 26 moves a drive screw 24 along an axis in the directions 100 to move the brake shoes 4.

Figure 4:
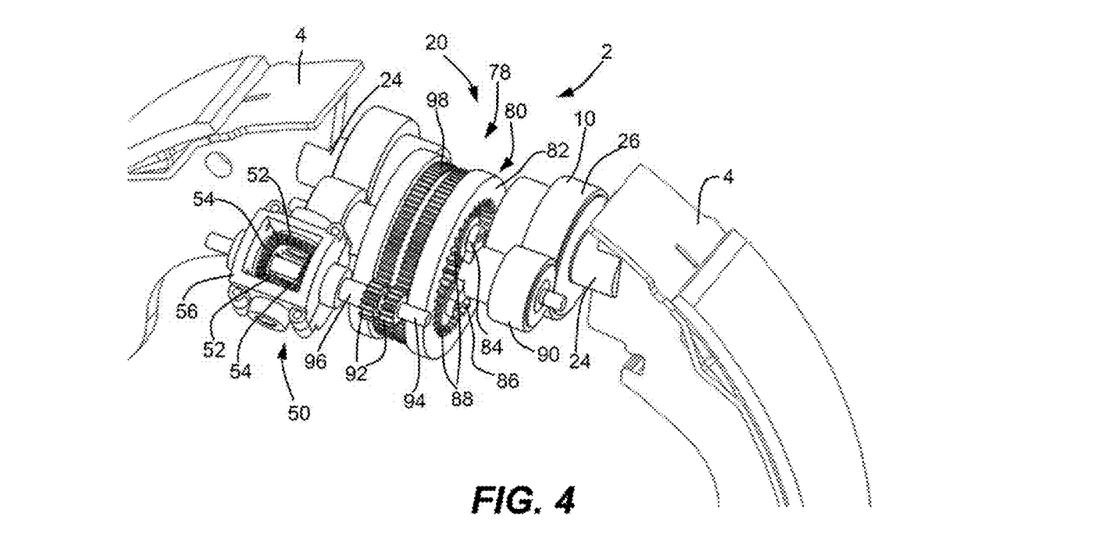
FIG. 4 illustrates a brake system including another example of a linear actuator assembly between two brake shoes.

FIG. 4 illustrates a brake assembly 2 including a pair of brake shoes 4 and linear actuator assembly 20. The linear actuator assembly 20 includes a differential assembly 50 and a torque multiplication assembly 78, which as shown is a planetary assembly 80, in communication with a linear actuator for moving the pair of brake shoes 4. The differential assembly 50 includes a housing 56 that includes a pair of side gears 54 connected by a plurality of pinion gears 52. One side gear 54 is connected to an inner shaft 94 and one side gear 54 is connected to an outer shaft 96. The inner shaft 94 and the outer shaft 96 each include a power gear 92 that are each in communication with drive gear 98 that is in communication with a sun gear 86, which is in communication with planet gears 88 located inside of a stationary annular gear 82 of the planetary assembly 80. The torque multiplication assembly 78 in the form of a planetary assembly 80 performs a gear reduction from the differential assembly 50 to the output shaft 90 so that rotational speed of the gears within the brake assembly 2 are slowed and the torque provided to the brake shoes 4 is increased. Each of the annular gears 82 are in communication with a plurality of planet gears 88 that are connected to a carrier 84 and surround a sun gear 86. The carrier 84 includes an output shaft 90 that is in communication with a drive gear 26 of the linear actuator 40. The drive gear 26 when rotated, axially moves a drive screw 24 that moves the brake shoes 4. The gears are illustrated as being smooth but the gears may include teeth for transferring power between gears.

Figure 5A:
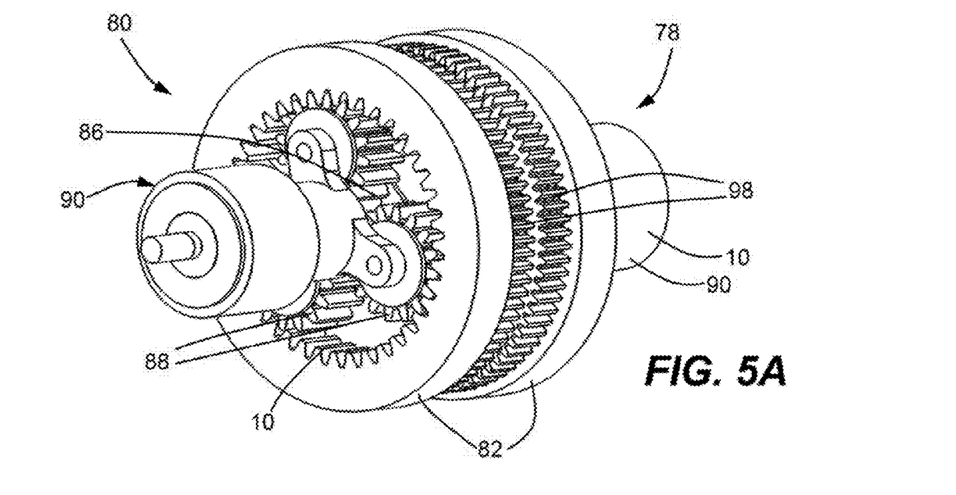
FIG. 5A illustrates a perspective view an example of a torque multiplication assembly of FIG. 4.

FIG. 5A illustrates a perspective view of the torque multiplication assembly 78 of FIG. 4. The torque multiplication assembly 78 is a planetary assembly 80 that includes two discrete halves that rotate independently of each other. As illustrated, the planetary assembly 80 includes two annular gears 82 having teeth 10 on an inner diameter and the two annular gears 82 forming book ends around two drive gears 98. The drive gears 98 each rotate a sun gear 86 that transfers power to the planet gears 88, which then rotate the output shafts 90 so that power is provided via teeth 10 on the output shafts 90 to brake shoes (not shown). The sun gears 86 and planet gears 88 are located within the annular gears 82 which are maintained in a static position during use.

Figure 5B:
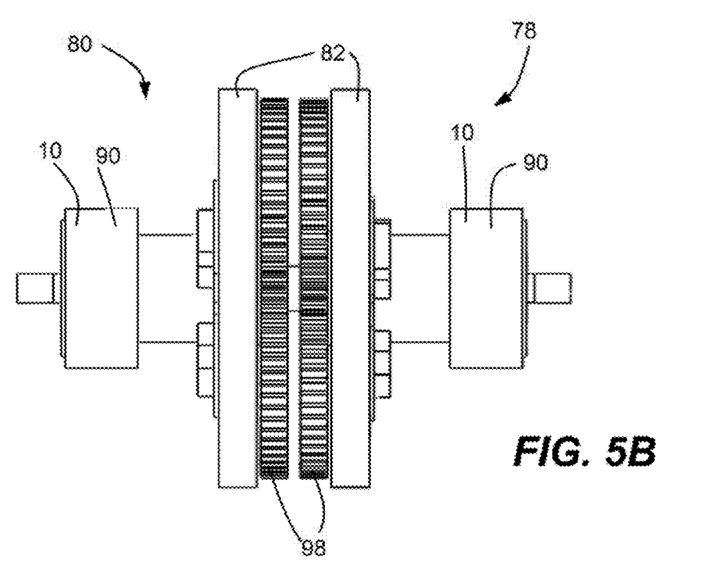
FIG. 5B illustrates a plan view of the torque multiplication assembly of the of FIG. 5A.

FIG. 5B is a side view of the torque multiplication assembly 78 of FIG. 5A. The torque multiplication assembly 78 is a planetary assembly 80 and as shown has two discrete and mirror image halves are visible. The two annular gears 82 are located on each side of the two drive gears 98. The drive gears each are connected to a rotate a sun gear (not shown) that provides power to a plurality of planet gears (not shown). The planet gears 88 transfer power from the drive gears 98 to the output shafts 90 after the torque has been increased and speed has been decreased from the drive gears 98 via the sun gears and the planet gears 88. The output shafts 90 include teeth to transfer power from the output shafts 90.

Figure 5C:
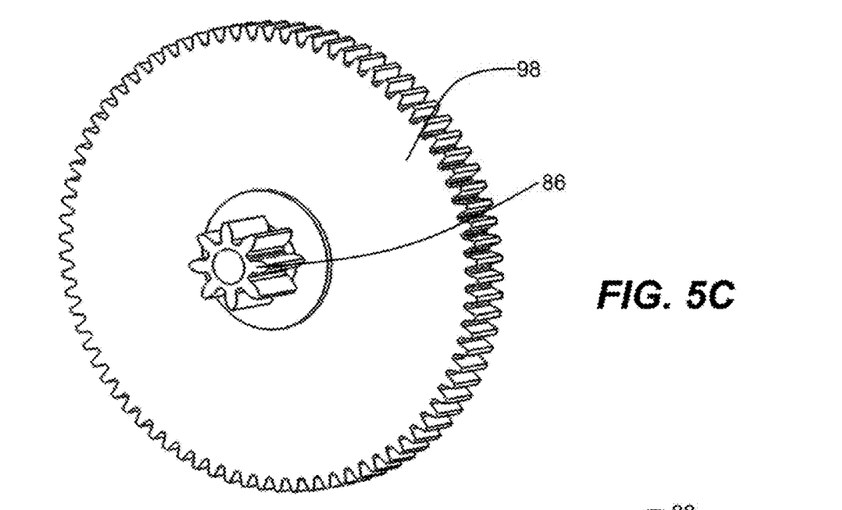
FIG. 5C illustrates an example of a drive gear and sun gear.

FIG. 5C illustrates a drive gear 98 and sun gear 86 removed from the planetary assembly 80. The sun gear 86 and drive gear 98 are integrally connected so that the drive gear 98 moves the sun gear 86.

Figure 5D:
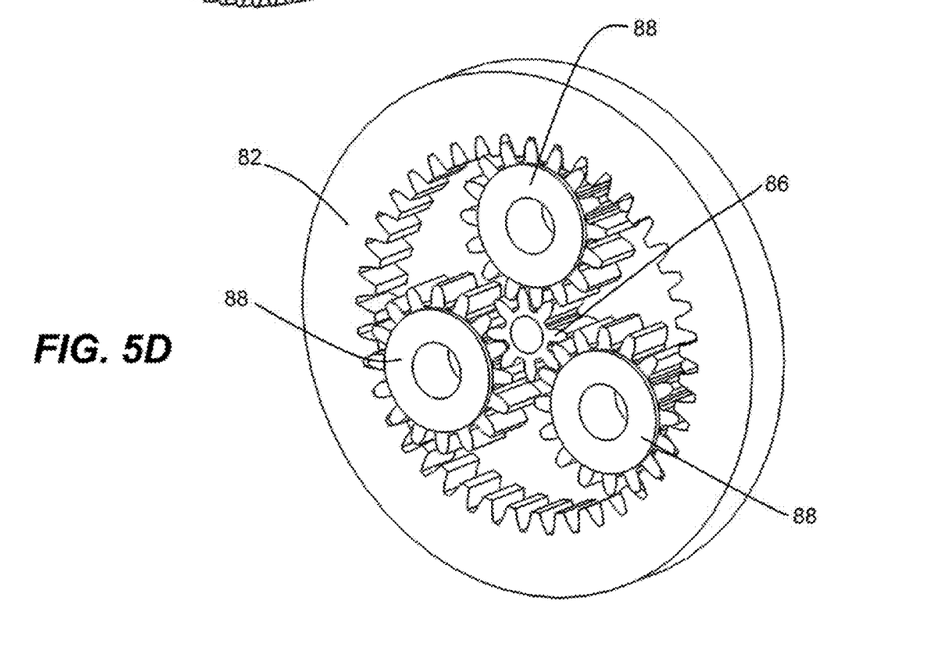
FIG. 5D illustrates an annular gear and other associated gears.

FIG. 5D illustrates the sun gear 86 located between a plurality of planet gears 88 so that movement of the sun gear 86 moves the planet gears 88. The planet gears 88 are maintained around the sun gear 86 via an annular gear 82 that remains stationary during movement of the planet gears 88 and sun gear 86.

Figure 6:
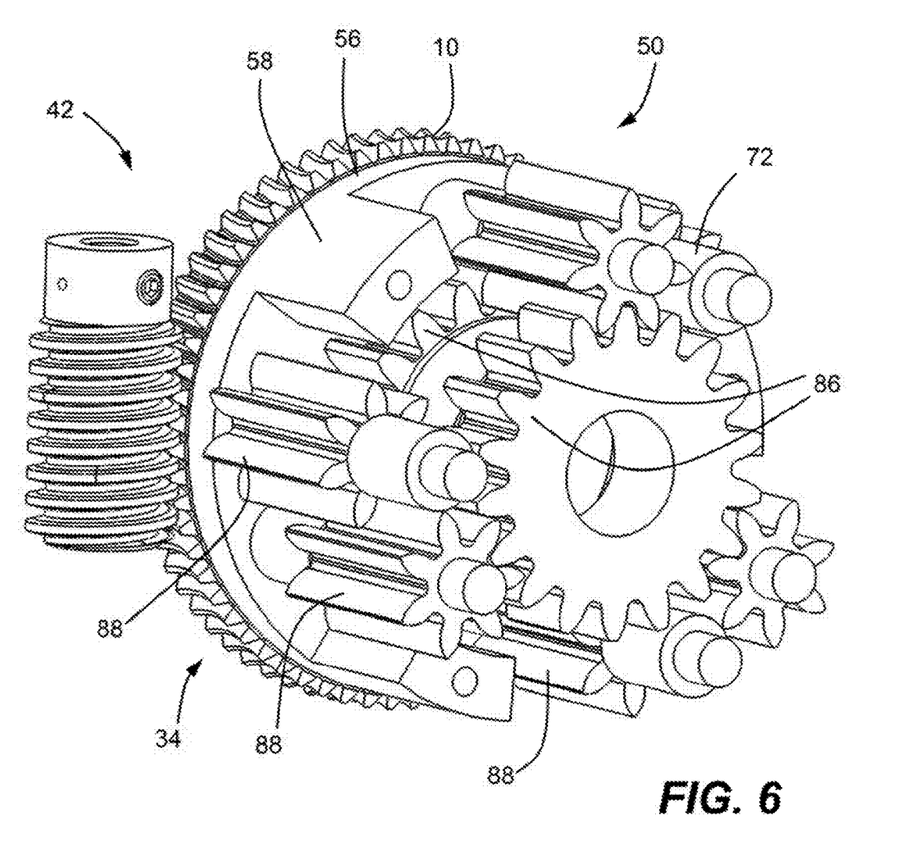
FIG. 6 illustrates another example of a differential assembly.

FIG. 6 illustrates a close up view of a differential assembly 50 of FIG. 3. The differential 50 assembly includes a housing 56 having two housing carriers 58 (one housing carrier not shown) connected to a ring gear 34. The ring gear 34 includes a plurality of teeth 10 that are rotated via a worm gear 42. The ring gear 34 when rotated transfers power and rotates the housing 56 which in turn rotates planet gears 88 that transfer power to a pair of sun gears 86 located in the center of the planet gears 88. The planet gears 88 are alternated with spacers 72 so that one spacer 72 is proximate to one sun gear 86 and an adjacent planet gear 88 is in contact with the other sun gear 86 and the next group includes a spacer 72 proximate to the other sun gear 86 and an adjacent planet gear 88 in contact with the one sun gear 86.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70 it is intended that values such as 15 to 85, 22 to 68, 43 to 51, 30 to 32 etc. are expressly enumerated in, this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

I claim:

1. A linear actuation assembly comprising:
   a. a differential assembly; and
   b. a pair of linear actuators in communication with the differential assembly;
   wherein the pair of linear actuators are movable along an axis so that during movement of at least a portion of each of the pair of linear actuators a pair of brake shoes respectively are moved to create a parking brake force or moved to release a parking brake force,
   wherein when a parking brake is applied, the differential assembly distributes power equally to each of the pair of linear actuators until resistance of one of the pair of brake shoes increases then the differential assembly ceases to provide power to a brake shoe with increased resistance and distributes the power from the brake shoe with increased resistance to a brake shoe of lower resistance until the parking brake force is created,
   wherein the differential assembly is located between the pair of brake shoes,
   wherein the differential assembly is connected to a motor and the motor provides the power to the differential assembly and the differential assembly transfers power to the pair of linear actuators, and
   wherein the motor drives a worm gear and the worm gear transfers the power to a ring gear of the differential assembly.

2. The linear actuation assembly of claim 1, wherein the differential assembly includes a pair of side gears and each of the side gears are in communication with one of the linear actuators via a contact portion.

3. The linear actuation assembly of claim 2, wherein the pair of side gears are in communication with each other by a plurality of pinion gears.

4. The linear actuation assembly of claim 2, wherein each of the side gears include a contact portion that extends outward into communication with a drive gear of the linear actuator so that movement of the side gear moves the linear actuator.

5. The linear actuation assembly of claim 1, wherein each of the linear actuators include a drive screw located within a drive gear and upon rotation of the drive gear the drive screw is moved along the axis.

6. The linear actuation assembly of claim 5, wherein the pair of linear actuators are located within a housing.

7. The linear actuation assembly of claim 1, wherein the differential assembly is in communication with a torque multiplication assembly that is in communication with each of the pair of linear actuators, and the torque multiplication assembly increases torque from the differential assembly to the pair of linear actuators, reduces a rotational speed of the linear actuators relative to the differential assembly, or both.

8. The linear actuation assembly of claim 7, wherein the torque multiplication assembly is a planetary assembly that includes as pair of annular gears that each surround a plurality of planet gears and a sun gear, and the sun gear rotates the plurality of planet gears, which are connected via as earner so that rotation the carrier transfers power to each of the respective linear actuators.

9. The linear actuation assembly of claim 1, wherein one of the pair of linear actuators is located on a first side of the differential assembly and one of the pair of linear actuators is located on a second side of the differential assembly.

10. The linear actuation assembly of claim 1, wherein a ring gear is in communication with the differential assembly and the ring gear rotates the differential assembly during actuation of the pair of brake shoes.

11. The linear actuation assembly of claim 1, wherein the differential assembly includes an inner shaft and an outer shaft that extend from the differential assembly, and the inner shaft and the outer shaft each include a power gear that provides power from the differential assembly to a linear actuator, a torque multiplication assembly, or both.

12. The linear actuation assembly of claim 1, wherein the differential assembly includes a ring gear that supplies the power to the differential assembly so that the power is distributed to each of the linear actuators individually or in unison.

13. A brake assembly comprising:
   a. a pair of spaced apart brake shoes each including a first end and a second end; and
   b. a linear actuator assembly located between the first end of the pair of spaced apart brake shoes, the linear actuator assembly comprising:
      i. a motor,
      ii. a differential assembly in communication with the motor, and
      iii. a pair of spaced apart linear actuators in communication with the differential assembly and each of the pair of spaced apart linear actuators in communication with a first end of one of the pair of spaced apart brake shoes;

wherein when a parking brake is applied, the motor supplies power to the differential assembly and the differential assembly distributes the power to each of the linear actuators and the linear actuators move the brake shoes equally until one of the brake shoes experience a higher resistance and then the differential assembly shifts power and supplies additional power to the brake shoe with a lower resistance, and wherein a torque multiplication assembly is located between and in communication with the differential assembly and the linear actuators so that torque from the differential assembly is increased and transferred to each of the drive gears of the linear actuators, rotational speed of the drive gears within the linear actuators are lower than the rotational speed of the differential assembly, or both.

14. The brake assembly of claim 13, wherein each of the pair of spaced apart linear actuators include a drive gear with a drive screw extending through the drive gear so that rotation of the drive gear moves the drive screw and the pair of spaced apart brake shoes along an axis to create a braking force, a brake retract, or both.

15. The brake assembly of claim 13, wherein the motor is directly connected to the differential assembly.

16. The brake assembly of claim 13, wherein a reduction gear is in communication with the motor and the differential assembly so that the differential assembly is rotated at a slower rate than the motor rotates.

17. The brake assembly of claim 13, wherein the motor drives a worm gear and the worm gear moves a ring gear of the differential assembly.

* * * * *

UNITED STATES PATENT AND TRADEMARK OFFICE
CERTIFICATE OF CORRECTION

PATENT NO.         : 9,476,469 B2                                      Page 1 of 1
APPLICATION NO.    : 14/567617
DATED              : October 25, 2016
INVENTOR(S)        : Kenneth Eric Gutelius It is certified that error appears in the above-identified patent and that said Letters Patent is hereby corrected as shown below:

In the Claims

Column 16, Claim 8, Line 3, should read "includes a pair," instead of "includes as pair"

Column 16, Claim 8, Line 6, should read "via a carrier," instead of "via as earner"

Signed and Sealed this
Twenty-fifth Day of April, 2017

Michelle K. Lee
*Director of the United States Patent and Trademark Office*